(12) United States Patent   (10) Patent No.: US 8,795,134 B2
Saito et al.                    (45) Date of Patent:    Aug. 5, 2014

(54) CONTROL APPARATUS FOR VEHICULAR AUTOMATIC TRANSMISSION

(75) Inventors: Hidenori Saito, Nagoya (JP); Toshio Sugimura, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/996,131

(22) PCT Filed: Dec. 25, 2010

(86) PCT No.: PCT/JP2010/073467
§ 371 (c)(1),
(2), (4) Date: Jun. 20, 2013

(87) PCT Pub. No.: WO2012/086092
PCT Pub. Date: Jun. 28, 2012

(65) Prior Publication Data
US 2013/0267381 A1    Oct. 10, 2013

(51) Int. Cl.
*B60W 10/00*  (2006.01)
(52) U.S. Cl.
USPC .................................. 477/79; 477/903

(58) Field of Classification Search
USPC .................. 477/50, 79, 166, 174, 180, 906
See application file for complete search history.

(56) References Cited

U.S. PATENT DOCUMENTS

| 7,736,270 | B2 * | 6/2010 | Gierer et al. | 477/175 |
| 8,439,175 | B2 * | 5/2013 | Ishikawa et al. | 192/3.29 |
| 2008/0176709 | A1 * | 7/2008 | Wu et al. | 477/143 |
| 2009/0171545 | A1 | 7/2009 | Shimizu et al. | |
| 2012/0290180 | A1 | 11/2012 | Shimizu et al. | |

FOREIGN PATENT DOCUMENTS

JP    A-2008-281111    11/2008
WO   WO 2009/084294 A1   7/2009

* cited by examiner

*Primary Examiner* — Justin Holmes
(74) *Attorney, Agent, or Firm* — Oliff PLC

(57) ABSTRACT

A control apparatus for a vehicular automatic transmission configured to selectively establish a plurality of shift positions by engaging respective combinations of two frictional coupling devices of a plurality of frictional coupling devices, with output hydraulic pressures of respective ones of a plurality of solenoid valves provided in a hydraulic control circuit, includes: a normal-state output regulation control portion and an electrically-normal-state determining portion.

2 Claims, 5 Drawing Sheets

|     | C1 | C2 | C3 | C4 | B1 | B2 | F1 |
|-----|----|----|----|----|----|----|----|
| 1st | ○  |    |    |    |    | ◎  | ○  |
| 2nd | ○  |    |    | ○  |    |    |    |
| 3rd | ○  |    | ○  |    |    |    |    |
| 4th | ○  |    |    | ○  |    |    |    |
| 5th | ○  | ○  |    |    |    |    |    |
| 6th |    | ○  |    | ○  |    |    |    |
| 7th |    | ○  | ○  |    |    |    |    |
| 8th |    | ○  |    |    | ○  |    |    |
| R1  |    |    | ○  |    |    | ○  |    |
| R2  |    |    |    | ○  |    | ○  |    |
| N   |    |    |    |    |    |    |    |

○ : ENGAGED

◎ : ENGAGED UPON REVERSE POWER TRANSMISSION

CONTROL APPARATUS FOR VEHICULAR AUTOMATIC TRANSMISSION

TECHNICAL FIELD

The present invention relates to a control apparatus for a vehicular automatic transmission configured to perform shifting actions by using a plurality of solenoid valves provided in a hydraulic control circuit.

BACKGROUND ART

There is well known a control apparatus for a vehicular automatic transmission configured to selectively establish a plurality of shift positions by engaging respective combinations of two frictional coupling devices of a plurality of frictional coupling devices, with output hydraulic pressures of respective ones of a plurality of solenoid valves provided in a hydraulic control circuit. The above-indicated hydraulic control circuit may suffer from an abnormal output of any solenoid valve, which takes place due to an abnormal switching operation of the solenoid valve per se caused by sticking of a valve spool in the presence of a foreign matter, for example, a hardware abnormality such as disconnection or shorting of a wire used to apply an electric signal to the solenoid valve, and an abnormality of an electronic control device per se, which operates to determine a need for shifting the automatic transmission and generate the electric signal. Such an abnormal output of the solenoid valve may cause an engaging action of any frictional coupling device other than the frictional coupling devices normally required to be placed in the engaged state for establishing the selected shift position of the automatic transmission, namely, any frictional coupling device not required to be placed in the engaged state for establishing the selected shift position. In this event, one of the frictional coupling devices placed in the engaged state, which has the smallest torque capacity, is brought into a slipping state, with a result of establishing one of the shift positions with the engaging actions of the other two non-slipping frictional coupling devices. As shown in the example of FIG. 8 a situation is supposed where a $7^{th}$ speed position is established by the engaging actions of clutches C2 and C3 which are performed at a maximum engaging hydraulic pressure in a normal state. If a clutch C1 not required to establish the selected $7^{th}$ shift position is engaged due to an abnormal output of a solenoid valve SL1 in this example, the clutch C2 of the three clutches C1-C3 is brought into the slipping state, so that a $3^{rd}$ speed position may be established by the engaging actions of the clutches C1 and C3. As a result, the automatic transmission is shifted down from the $7^{th}$ speed position to the $3^{rd}$ speed position, causing a comparatively high stepping ratio of the speed ratio (ratio of the speed ratios of the two shift positions=speed ratio of the lower-speed position/speed ratio of the higher-speed position), and a rise of the operating speed of an engine and deceleration of the vehicle by a braking torque of the engine, which lead to deterioration of durability of the engine and a power transmitting system, and reduction (deterioration) of drivability of the vehicle.

In view of a possibility of occurrence of the abnormal output of the solenoid valve described above, there has been proposed to provide the hydraulic control circuit with a fail-safe valve having a fail-safe function to prevent the engaging action of a frictional coupling device due to the abnormal output of the solenoid valve, by cutting off an oil passage provided to apply the output hydraulic pressure of the abnormal solenoid valve to the frictional coupling device, or to establish a fail-safe shift position so as to reduce the stepping ratio of the speed ratio (difference of the speed ratios), by switching the oil passages utilizing the output hydraulic pressure of the abnormal solenoid valve. On the other hand, it is desirable not to use the fail-safe valve, from the standpoint of needs for reducing the weight and size of the hydraulic control circuit and for reducing the number of the required components. Namely, it is desirable to provide a fail-safe function equivalent to that of the fail-safe valve, without using the fail-safe valve. Patent Document 1 discloses a control apparatus for a transmission configured to perform shifting actions using a hydraulic control circuit not provided with the fail-safe valve, which control apparatus determines, on the basis of amounts of electric current applied to solenoid valves, whether the number of the solenoid valves concurrently placed in the engaged state is larger than in the normal states of the solenoid valves, and cuts off the supply of an electric power to the irrelevant solenoid valve other than the solenoid valves required to be placed in the engaged state, if the number is larger than in the normal states, so that the control apparatus performs the fail-safe function equivalent to that of the fails-safe valve.

PRIOR ART DOCUMENT

Patent Document

Patent Document 1: JP-2008-281111A

SUMMARY OF THE INVENTION

Object Achieved by the Invention

By the way, the technique disclosed in the above-identified Patent Document 1 requires constant monitoring of the amounts of electric current applied to the solenoid valves, and permits to perform the fail-safe function only after occurrence of an abnormal output of any of the solenoid valves. That is, the technique disclosed in the Patent Document 1 makes it possible to eliminate the need for providing the fail-safe valve, but requires an electric circuit for detecting a total amount of electric current applied to the solenoid valves, a switch for connecting and disconnecting a signal line for supplying an electric power to the irrelevant solenoid valve, and an electric circuit for opening and closing the switch on the basis of the detected total amount of electric current. In addition, the technique disclosed in the Patent Document 1 deals with only abnormal outputs of the electric signals for operating the solenoid valves, but does not deal with any other abnormal outputs of the solenoid valves due to abnormal switching operations of the solenoid valves per se. Thus, the hydraulic control circuit not provided with the fail-safe valve is required to be further improved in operation of its fail-safe function equivalent to that of the fail-safe valve. In this respect, it is noted that the problem described above is not publicly known, and that there has been no proposal to permit an adequate fail-safe function to be performed upon occurrence of an abnormal output of any solenoid valve, by dealing with the abnormality prior to the occurrence, without using the fail-safe valve and without requiring an additional hardware to perform the fail-safe function.

The present invention was made in view of the background art described above. It is therefore an object of the present invention to provide a control apparatus which permits an adequate fail-safe function to be performed upon occurrence of an abnormal output of any solenoid valve, without providing a hydraulic control circuit with a fail-safe valve.

Means for Achieving the Object

The object indicated above can be achieved according to the principle of this invention, which provides a control apparatus for (a) a vehicular automatic transmission configured to selectively establish a plurality of shift positions by engaging respective combinations of two frictional coupling devices of a plurality of frictional coupling devices, with output hydraulic pressures of respective ones of a plurality of solenoid valves provided in a hydraulic control circuit, (b) characterized by regulating the output hydraulic pressure of the solenoid valve for placing one of the two frictional coupling devices in an engaged state to place the vehicular automatic transmission in a predetermined one of the shift positions, such that a torque capacity of the above-described one frictional coupling device is smaller than a maximum value but is large enough to prevent the above-described one frictional coupling device from being brought into a slipping state in the normal state of each solenoid valve, and such that the torque capacity permits the above-described one frictional coupling device to be brought into the slipping state in the event of an engaging action of another of the plurality of frictional coupling devices caused by an abnormal output of another of the plurality of solenoid valves which is other than the two solenoid valves for engaging the above-described two frictional coupling devices, so that the vehicular automatic transmission is shifted to a predetermined fail-safe shift position different from the above-described predetermined shift position, with the engaging action of the above-described another frictional coupling device and an engaging action of the other of the two frictional coupling devices.

Advantages of the Invention

The control apparatus described above is configured to regulate the output hydraulic pressure of the solenoid valve for placing one of the two frictional coupling devices in the engaged state to establish the predetermined one of the shift positions in the normal state of each of the solenoid valves, such that the torque capacity of the above-described one frictional coupling device is smaller than the maximum value but is large enough to prevent the above-described one frictional coupling device from being brought into the slipping state in the normal state of each solenoid valve, and such that the torque capacity permits the above-described one frictional coupling device to be brought into the slipping state in the event of the engaging action of another of the plurality of frictional coupling devices caused by the abnormal output of another of the plurality of solenoid valves which is other than the two solenoid valves for engaging the above-described two frictional coupling devices, so that the vehicular automatic transmission is shifted to the predetermined fail-safe shift position different from the above-described predetermined shift position, with the engaging action of the above-described another frictional coupling device and the engaging action of the other of the two frictional coupling devices. Accordingly, it is possible to prevent a shift-down action of the vehicular automatic transmission to any one of the shift positions, which causes a comparatively high stepping ratio of the speed ratio, even if the frictional coupling device not required to be placed in the engaged state to establish the predetermined shift position of the vehicular automatic transmission is brought into the engaged state in the event of an abnormal output of any of the solenoid valves. Namely, the shift-down action to the shift position causing the comparatively high stepping ratio of the speed ratio can be prevented by determining the frictional coupling device which is brought into the slipping state to establish the fail-safe shift position, in the event of an abnormal output of any of the solenoid valves. For example, the level of the electric signal for energizing one of the solenoid valves for engaging one of the two frictional coupling devices in the normal state of each solenoid valve, which one frictional coupling device cooperates with the frictional coupling device to be brought into the engaged state in the event of the above-indicated abnormal output of the corresponding solenoid valve, to shift down the vehicular automatic transmission to the shift position causing the comparatively high stepping ratio of the speed ratio, is determined so as to prevent the slipping action of the above-indicated one frictional coupling device in the normal state of each solenoid valve, but to permit the slipping action of this one frictional coupling device in the event of the above-indicated abnormal output, so that the vehicular automatic transmission is shifted down to the fail-safe shift position, in the event of the abnormal output, with the engaging action of the frictional coupling device caused by the abnormal output, and the engaging action of the other of the above-indicated two frictional coupling devices, whereby the shift-down action to the shift position causing the comparatively high stepping ratio of the speed ratio can be prevented. Thus, the present invention permits the fail-safe function to be performed adequately, in the event of an abnormal output of any of the solenoid valves, without the provision of a fail-safe valve.

In one preferred form of the present invention, the control apparatus makes an electrically-normal-state determination as to whether each of the above-described solenoid valves is in an electrically normal state, depending upon whether an electric signal being applied to each solenoid valve has a maximum level corresponding to a maximum value of the output hydraulic pressure of each solenoid valve, when the vehicular automatic transmission is placed in any one of forward-drive shift positions, the electric signal having the maximum level corresponding to the maximum value of the output hydraulic pressure of each of the solenoid valves corresponding to the frictional coupling devices for placing the vehicular automatic transmission in the above-indicated any one of the forward-drive shift positions is applied at least once to each solenoid valve when the vehicular automatic transmission is placed in the above-indicated any one of the forward-drive shift positions. In this form of the invention, the electrically-normal-state determination can be adequately made. For example, the electrically-normal-state determination can be adequately made in a forward-drive position "D" (forward-drive shift position), if it is determined at least once during a run (trip) of the vehicle between the moments of on and off operations of an ignition switch of the vehicle, that the electric signal applied to each solenoid valve has the maximum level corresponding to the maximum output hydraulic pressure of the solenoid valve.

Where the frictional coupling device to be engaged by a given solenoid valve is placed in the engaged state to place the automatic transmission in both a forward-drive shift position and a reverse-drive shift position, however, the output hydraulic pressure of the solenoid valve is required to have the maximum value for placing the frictional coupling device to establish the reverse-drive shift position, but is required to be lower than the maximum value, to establish any forward-drive shift position, for dealing with an abnormal output of any of the solenoid valves. Accordingly, when the automatic transmission is placed in the forward-drive shift position, it is not possible to adequately make the electrically-normal-state determination. That is, since the output hydraulic pressure of the solenoid valve for engaging the frictional coupling device is required to have the maximum value for establishing the reverse-drive shift position, it is not possible to make the electrically-normal-state determination of the solenoid valve, on the basis of the electric signal which indicates to output lower output hydraulic pressure than the maximum output hydraulic pressure. Accordingly, it may not be possible to not only adequately perform the fail-safe function in the event of the abnormal output of any other solenoid valve, but also adequately make the electrically-normal-state determination for each solenoid valve.

In view of the above, the above-indicated predetermined shift position is preferably a shift position from which the vehicular automatic transmission is shifted down to another shift position by the engaging action of the above-indicated another frictional coupling device caused by the abnormal output of the above-indicated another solenoid valve, and an engaging action of the above-indicated one frictional coupling device, and a stepping ratio of a speed ratio between the above-indicated predetermined shift position and the above-indicated another shift position is higher than an upper limit. In this form of the invention, the level of the electric signal to be applied to the solenoid valve for placing the above-indicated one frictional coupling device in the engaged state when the vehicular automatic transmission is placed in the above-indicated predetermined shift position is lower than a maximum value corresponding to the maximum value of the output hydraulic pressure of the solenoid valve for placing the above-indicated one frictional coupling device in the engaged state, and is a value to allow the above-indicated one frictional coupling device to be brought into the slipping state. Accordingly, the vehicular automatic transmission is held in the predetermined shift position in the normal state of each solenoid valve, and the fail-safe function can be adequately performed in the event of an abnormal output of any of the solenoid valves. Further, the level of the electric signal to be applied to the solenoid valve for placing the above-indicated one frictional coupling device in the engaged state is made lower than the maximum value corresponding to the maximum value of the output hydraulic pressure of that solenoid valve, only when the vehicular automatic transmission is placed in the above-indicated predetermined shift position, so that it possible to not only adequately perform the fail-safe function in the event of the abnormal output of any of the solenoid valves, but also adequately make the electrically-normal-state determination of each of the solenoid valves, without the provision of a fail-safe valve.

MODE FOR CARRYING OUT THE INVENTION

Figure 1:
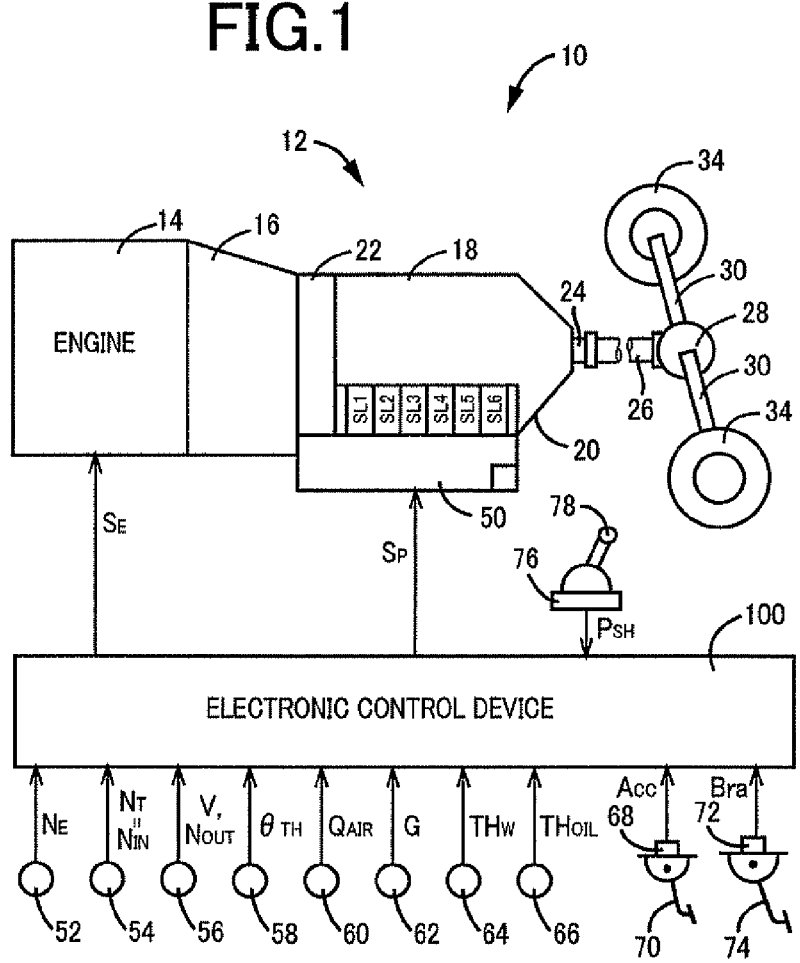
FIG. 1 is a schematic view for explaining an arrangement of a power transmitting path of a vehicle to which the present invention is applicable, and a major portion of a control system provided on the vehicle.

According to the present invention, the above-described vehicular automatic transmission is preferably a step-variable automatic transmission in which a plurality of speed ratios that are set stepwise are mechanically established. For instance, the step-variable automatic transmission is a multiple-step transmission of various planetary gear types constituted by a plurality of planetary gear sets having rotary elements (rotary members) which are selectively connected to each other by frictional coupling devices, to selectively establish four, five, six or more shift positions (gear positions) of forward-drive shift positions, for example. The frictional coupling devices used in the multiple-step transmission of the planetary gear type may be commonly used coupling devices such as multiple-disk or single-disk type clutches and brakes, or belt-type brakes, which are placed in the engaged state by respective hydraulic actuators. An oil pump for supplying a working oil to those coupling devices may be driven by a vehicle drive power source, for example, to pressurize the working oil, or may be driven by an electric motor exclusively provided independently of the vehicle drive power source.

A hydraulic control circuit including the above-indicated coupling devices is preferably configured, from the standpoint of its operating response, to apply an output hydraulic pressure of each linear solenoid valve directly to the hydraulic actuator (hydraulic cylinder) of the corresponding coupling device, but may be provided with a shift control valve which is controlled according to the output hydraulic pressures of the linear solenoid valves used as pilot pressures, so that the working oil is supplied from the shift control valve to the hydraulic actuators.

Preferably, the above-indicated linear solenoid valves are provided for respective ones of a plurality of coupling devices. However, various arrangements of the linear solenoid valves are available. Where the coupling devices include a plurality of coupling devices whose engaging actions or engaging and releasing actions are not concurrently controlled, for example, a common linear solenoid valve may be provided for those coupling devices. The operating states of all coupling devices need not be hydraulically controlled by the linear solenoid valves, and the operating states of all or some of the coupling devices may be hydraulically controlled by ON-OFF solenoid valves or any other pressure regulating means, the duty ratios of which are controlled to control the coupling devices. The expression "apply the hydraulic pressure" used herein is interpreted to mean "cause the hydraulic pressure to act on the appropriate device" or "supply the working oil of the hydraulic pressure to the appropriate device".

The above-indicated vehicle drive power source is preferably an engine commonly used as an internal combustion engine, such a gasoline engine and a diesel engine. An electric motor or electric motors, for example, may be used as an assisting vehicle drive power source, in addition to the engine. Alternatively, only an electric motor or electric motors may be used as the vehicle drive power source.

An embodiment of this invention will be described in detail by reference to the drawings.

[Embodiment]

Figures 2, 3:
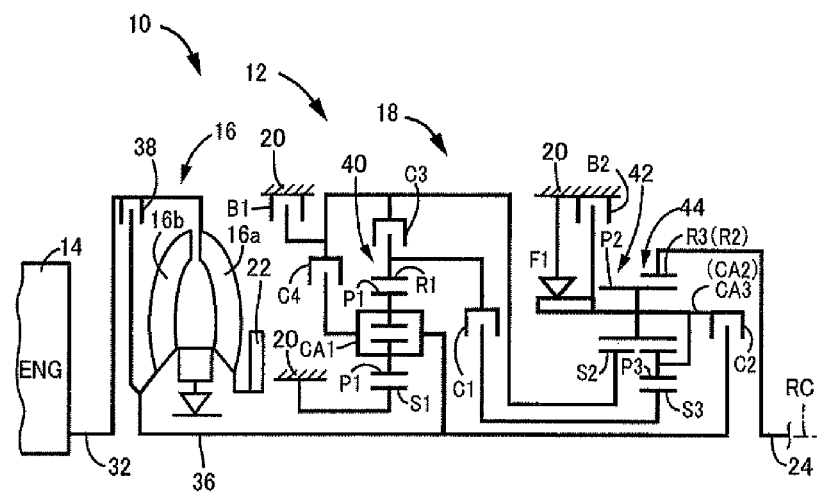
FIG. 2 is a schematic view for explaining a power transmitting system of the vehicle.
FIG. 3 is a table indicating a relationship between shift positions of an automatic transmission and respective combinations of operating states of coupling devices.

FIG. 1 is the schematic view for explaining an arrangement of a power transmitting path between an engine 14 and drive wheels 34 of a vehicle 10 to which the present invention is applicable, and a major portion of a control system provided on the vehicle 10, which is configured to implement an output control of the engine 14 and a shift control of a vehicular automatic transmission 18 (hereinafter referred to as "automatic transmission 18"). FIG. 2 is the schematic view for explaining the automatic transmission 18. It is noted that a lower half of each of a torque converter 16, the automatic transmission 18, etc., which are mostly symmetrical in construction with respect to an axis (axis RC), is not shown in FIG. 2. It is also noted that the axis RC indicated in FIG. 2 is an axis of rotation of the engine 14 and the torque converter 16.

As shown in FIGS. 1 and 2, a vehicular power transmitting system 12 (hereinafter referred to as "power transmitting system 12") is provided with the torque converter 16, an oil pump 22, and the automatic transmission 18, which are disposed on the axis RC within a transmission casing 20 (hereinafter referred to as "casing 20"), in the order of description as viewed from the engine 14. The transmission casing 20 is fixed to a vehicle body by bolts for example and serves as a non-rotative member. The power transmitting system 12 is further provided with a propeller shaft 26 connected to an output rotary member in the form of an output shaft 24 of the automatic transmission 18, a differential gear device (differential gear) 28 connected to the propeller shaft 26, and a pair of axles 30 connected to the differential gear device 28. The power transmitting system 12 thus constructed is suitably used for the vehicle 10 of an FR (front-engine rear-drive) type. In the power transmitting system 12, a drive force of the engine 14 is transmitted from a crankshaft 32 to the pair of drive wheels 34 through the torque converter 16, automatic transmission 18, propeller shaft 26, differential gear device 28 and pair of axles 30 in the order of description.

The torque converter 16 is a fluid-operated power transmitting device disposed such that the torque converter 16 rotates around the axis RC and configured to transmit a drive force received by its pump impeller 16a, to the automatic transmission 18 through a working fluid. This pump impeller 16a is an input rotary element which is connected to the engine 14 through the crankshaft 32 to receive the drive force of the engine 14 and which is rotatable about the axis RC. The torque converter 16 has a turbine impeller 16b which is an output rotary element spline-connected or otherwise connected to an input rotary member in the form of an input shaft 36 of the automatic transmission 18, such that the turbine impeller 16b is rotated together with the input shaft 36. The torque converter 16 is further provided with a lock-up clutch 38. This lock-up clutch 38 is a direct coupling clutch which disposed between the pump impeller 16a and the turbine impeller 16b and which is placed in an engaged state, a slipping state or a released state by the hydraulic control or the like.

The oil pump 22 is a mechanical oil pump connected to the pump impeller 16a and operated by the engine 14 to generate a hydraulic pressure for shifting the automatic transmission 18, controlling the torque capacity of the lock-up clutch 38, and supplying a lubricant to various points in the power transmitting path of the vehicle 10.

The automatic transmission 18 is a multiple-step transmission of a planetary gear type which constitutes a part of the power transmitting path between the engine 14 and the drive wheels 34 and which functions as a step-variable automatic transmission which is shifted to selectively establish a plurality of shift positions (gear positions) by respective combinations of operating states (namely, engaged and released states) of a plurality of hydraulically operated frictional coupling devices. For instance, the automatic transmission 18 is a step-variable transmission which is commonly used in a known vehicle and configured to perform so-called "clutch-to-clutch" shifting actions. The automatic transmission 18 has a first planetary gear set 40 of a double-pinion type, a Ravigneaux type second planetary gear set 42 of a single-pinion type, and a third planetary gear set 44 of a double-pinion type, which are coaxially disposed (on the axis RC), and is constructed to transmit a rotary motion of the input shaft 36 to the output shaft 24, at the selected speed ratio. This input shaft 36 is a turbine shaft rotated by the turbine impeller 16b of the torque converter 16.

As is well known, each of the first planetary gear set 40, second planetary gear set 42 and third planetary gear set 44 is constituted by three rotary elements (rotary members) consisting of: a sun gear (S1, S2, S3); a carrier (CA1, CA2, CA3) supporting a pinion gear (P1, P2, P3) such that the planetary gear is rotatable about its axis and about the axis of the sun gear; and a ring gear (R1, R2, R3) meshing with the sun gear through the pinion gear. A part of these three rotary elements are directly fixed together, or indirectly (or selectively) connected to each other or to the input shaft 36, casing 20 or output shaft 24, through hydraulically operated frictional coupling devices (clutches C1, C2, C3 and C4, and brakes B1 and B2) or a one-way clutch F1.

The above-described clutches C1, C2, C3 and C4 and brakes B1 and B2 (hereinafter collectively referred to as clutches C and brakes B, or coupling devices, unless otherwise specified) are hydraulically operated frictional coupling devices used in a conventional vehicular automatic transmission. Each of these frictional coupling devices is constituted by a wet-type multiple-disc clutch or brake whose friction plates which are forced against each other by a hydraulic actuator, or a band brake whose band is wound is tightened by a hydraulic actuator. Each of the clutches C and brakes B is selectively engaged or released by a hydraulic control circuit 50, and the torque capacity or engaging force of each clutch or brake is variable continuously, for example, by hydraulic pressure regulation by linear solenoid valves provided in the hydraulic control circuit 50, so that two members between which each clutch or brake is interposed are selectively connected or fixed to each other. It is noted that the torque capacity of each coupling device is determined by the friction coefficient of friction plates of the coupling device, and by the engaging hydraulic pressure with which the friction plates are forced against each other, and that for each coupling device to be able to transmit a required vehicle driving torque (required transmission input torque $T_{AT}$, for example) without slipping of the coupling device, the torque capacity of the coupling device should be larger than its assigned torque value corresponding to the required vehicle driving torque. For easy understanding of the present embodiment, the torque capacity and the engaging hydraulic pressure of each coupling device will be similarly handled, where appropriate.

By selectively engaging and releasing the clutches C and brakes B, eight forward-drive shift positions and two reverse-drive shift positions (gear positions) are established, according to an operation of the accelerator pedal by the vehicle operator, and a running speed V of the vehicle, for example, as indicated in the table of FIG. 3 indicating the operating states of the clutches C and brakes B. "1$^{st}$" through "8$^{th}$" indicated in FIG. 3 respectively represent the forward-drive shift positions in the form of 1st through 8th speed positions, and "R1" and "R2" respectively represent the reverse-drive shift positions in the form of a first reverse-drive position and a second reverse-drive position, while "N" represents a non-drive neutral position. A speed ratio γ of each gear position of the automatic transmission 18 (input speed $N_{IN}$/output speed $N_{OUT}$) is determined by gear ratios ρ1, ρ2 and ρ3 of the first planetary gear set 40, second planetary gear set 42 and third planetary gear set 44 (gear ratio=number of teeth of the sun gear/number of teeth of the ring gear).

The table of FIG. 3 indicates the relationship between the above-described shift positions and the operating states of the clutches C and brakes B. In this table, single-circles indicate the engaged state, and a double-circle indicates the engaged state during transmission of power in the reverse direction, while blanks indicate the released state. The automatic transmission 18 is placed in a selected one of a plurality of shift positions by engaging two frictional coupling devices selected from the plurality of frictional coupling devices, with the hydraulic pressures received from the respective linear solenoid valves provided in the hydraulic control circuit 50, as indicated in FIG. 3. In the automatic transmission 18 according to the present embodiment, the one-way clutch F1 is disposed in parallel to the brake B2, between the integrally formed carriers CA2, CA3 and the casing 20, such that the one-way clutch F1 permits rotary motions of the carriers CA2, CA3 in a forward direction (direction of rotation of the transmission input shaft 36), but inhibits their rotary motions in the opposite direction. Accordingly, the 1st speed position is established with an automatic engaging action of the one-way clutch F1, without the engaging action of the brake B2, when power is transmitted in the forward direction from the engine 14 toward the drive wheels 34.

Referring back to FIG. 1, the vehicle 10 is provided with an electronic control device 100 including a control apparatus for the automatic transmission 18, which is configured to implement a shift control and other controls of the automatic transmission 18. The electronic control device 100 includes a so-called microcomputer incorporating a CPU, a RAM, a ROM and an input-output interface. The CPU performs signal processing operations according to programs stored in the ROM, while utilizing a temporary data storage function of the RAM, to implement various controls of the vehicle 10. For instance, the electronic control device 100 implements the output control of the engine 14, the shift control of the automatic transmission 18, and a torque capacity control of the lock-up clutch 38. The electronic control device 100 may include mutually independent control units for respective different controls such as an engine output control unit and a hydraulic control unit, as needed.

The electronic control device 100 is configured to receive various signals including: an output signal of an engine speed sensor 52 indicative of an operating speed $N_E$ of the engine 14; an output signal of a turbine speed sensor 54 indicative of a turbine speed $N_T$ of the torque converter 16, namely, the transmission input speed $N_{IN}$, which is a rotating speed of the transmission input shaft 36; an output signal of an output shaft speed sensor 56 indicative of the transmission output speed $N_{OUT}$, which is the rotating speed of the output shaft 24 corresponding to the vehicle running speed V; an output signal of a throttle sensor 58 indicative of an opening angle $\theta_{TH}$ of an electronic throttle valve not shown; an output signal of an intake air quantity sensor 60 indicative of an intake air quantity $Q_{AIR}$ of the engine 14; an output signal of an acceleration sensor 62 indicative of a longitudinal acceleration value G (or longitudinal deceleration value G) of the vehicle 10; an output signal of a cooling water temperature sensor 64 indicative of a temperature $TH_W$ of a cooling water of the engine 14; an output signal of an oil temperature sensor 66 indicative of a temperature $TH_{OIL}$ of a working oil within the hydraulic control circuit 50; an output signal of an accelerator pedal operation amount sensor 68 indicative of an operation amount Acc of an accelerator pedal 70, which represents a vehicle drive force required by the vehicle operator to drive the vehicle 10 (an operator's required vehicle output); an output signal of a foot brake sensor 72 indicative of an operation amount Bra of a brake pedal 74, which represents a braking force required by the vehicle operator to brake the vehicle 10 (an operator's required vehicle deceleration value); and an output signal of a shift position sensor 76 indicative of a presently selected one of operating positions $P_{SH}$ (such as "P", "N", "D", "R" and "M" positions) of a shift lever 78 (shift lever positions or operating positions).

The electronic control device 100 is also configured to generate engine output control command signals $S_E$ for controlling the output of the engine 14, which include: a drive signal for operating a throttle actuator to control the throttle valve opening angle $\theta_{TH}$ according to the accelerator pedal operation amount Acc; a fuel injection signal for controlling an amount of a fuel to be injected from a fuel injecting device; and an ignition timing signal for controlling a timing of ignition of the engine 14 by an igniter. The electronic control device 100 further generates shift control command signals $S_P$ for controlling the shifting actions of the automatic transmission 18, namely, hydraulic command signals $S_P$ electric signals for driving the linear solenoid valves within the hydraulic control circuit 50, which include: electric signals for operating linear solenoid valves SL1-SLG provided within the hydraulic control circuit 50, to control the hydraulic actuators for the clutches C and brakes B, to shift the automatic transmission 18; and electric signals for operating linear solenoid valves to regulate a line pressure PL. The above-indicated electric signals are command signals indicative of amounts of electric current to be supplied from drive circuits incorporated within or provided outside of the electronic control device 100, to the linear solenoid valves (or command signals indicative of output hydraulic pressure values of the linear solenoid valves). It is noted that these command signals are considered to be the electric signals.

The shift lever 78 is manually operable to a selected one of: a parking position "P" in which the automatic transmission 18 is placed in a neutral state for cutting off its power transmitting path, and in which the output shaft 24 is held in a locked state; a reverse-drive position "R" for reverse driving of the vehicle; a neutral position "N" in which the automatic transmission 18 is placed in the neutral state; an automatic forward-drive position "D" in which the automatic transmission 18 is automatically shifted; and a manual forward-drive position "M" for establishing a manual shifting mode in which a so-called shifting range is selected and the automatic shifting actions of the automatic transmission 18 to higher speed ones of the shift positions are not available (or for permitting the automatic transmission 18 to be manually shifted by operations of the shift lever 78). In the manual forward-drive position "M", the brake B2 is placed in the engaged state to establish the 1st speed position even while the power is transmitted in the forward direction, so that the vehicle acceleration and deceleration response can be further improved, for instance.

Figure 4:
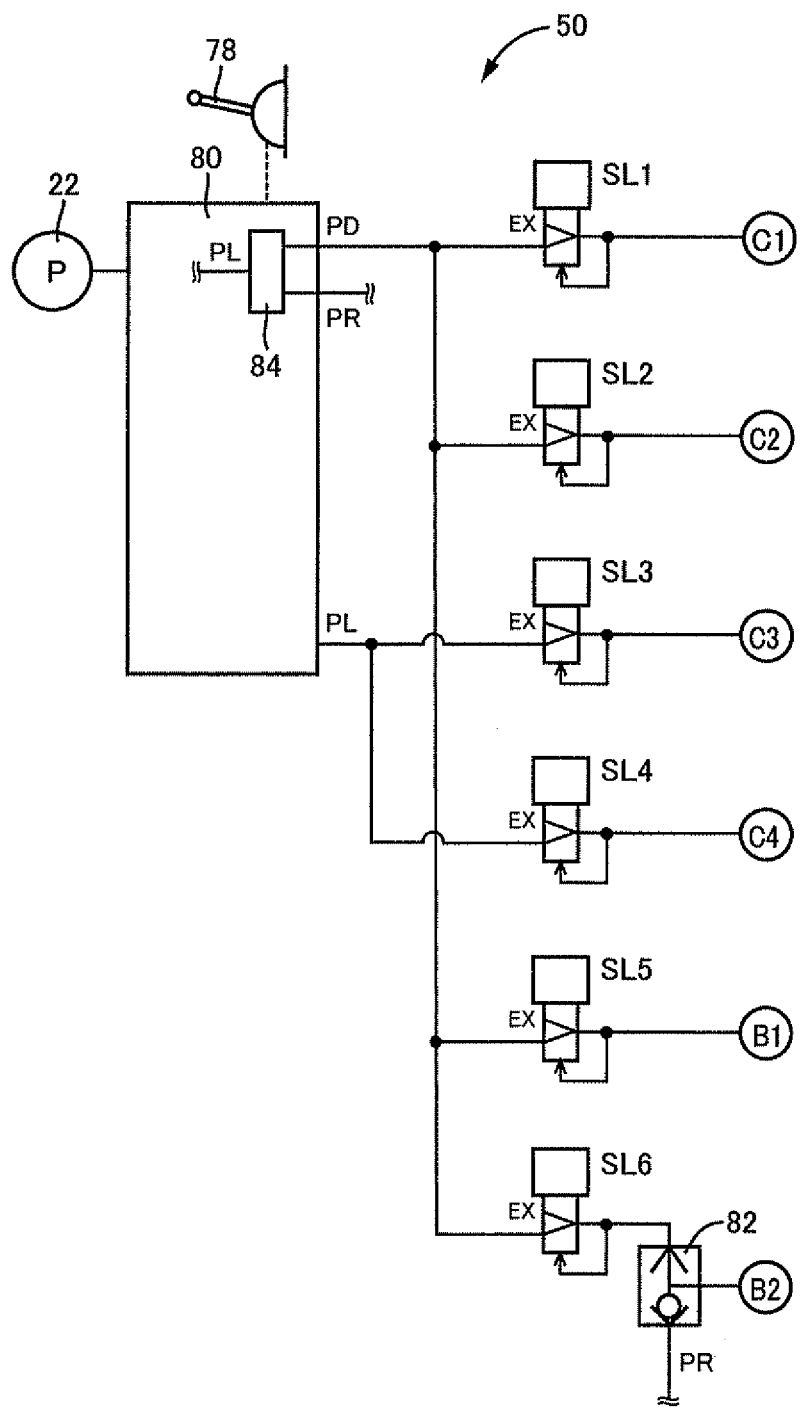
FIG. 4 is a circuit diagram illustrating a major portion of a hydraulic control circuit shown in FIG. 1, which is provided with linear solenoid valves for controlling operating states of hydraulic actuators of clutches and brakes.

FIG. 4 is the circuit diagram illustrating a major portion of the hydraulic control circuit 50, which is provided with the linear solenoid valves SL1-SL6 for controlling the operating states of the hydraulic actuators of the clutches C1, C2, C3 and C4 and the brakes B1 and B2. As illustrated in FIG. 4, a D-position pressure (forward-drive-position pressure) PD is applied from a hydraulic pressure supply device 80 to the hydraulic actuators (hydraulic cylinders) of the clutches C1, C2 and brakes B1, B2, through the respective linear solenoid valves SL1, SL2, SL5 and SL6, while the line pressure PL is applied from the hydraulic pressure supply device 80 to the hydraulic actuators of the clutches C3, C4 through the respective linear solenoid valves SL3 and SL4. The hydraulic actuator of the brake B2 receives one of the output pressure of the linear solenoid valve SL6 and a reverse-drive pressure (reverse-drive-position pressure) PR, through a shuttle valve 82. The hydraulic pressure supply device 80 receives the hydraulic pressure from the oil pump 22, and regulates this hydraulic pressure to generate the line pressure PL according to an engine load (e.g., engine torque $T_E$ or transmission input torque $T_{AT}$) as represented by the accelerator pedal operation amount Acc, so that the generated line pressure PL is applied to the various points. The hydraulic pressure supply device 80 is provided with a manual valve 84 mechanically or electrically operated to switch oil passages, according to an operation of the shift lever 78, such that the line pressure PL is generated as the D-position pressure PD or the reverse-drive pressure PR when the shift lever 78 is operated to the automatic forward-drive position "D" or the reverse-drive position "R". All of the linear solenoid valves SL1-SL6 have basically the same construction, and are energized and de-energized independently of each other under the control of the electronic control device 100, to control the hydraulic pressures to be applied to the hydraulic actuators, independently of each other, for controlling the engaging hydraulic pressures of the clutches C and brakes B.

Figure 5:
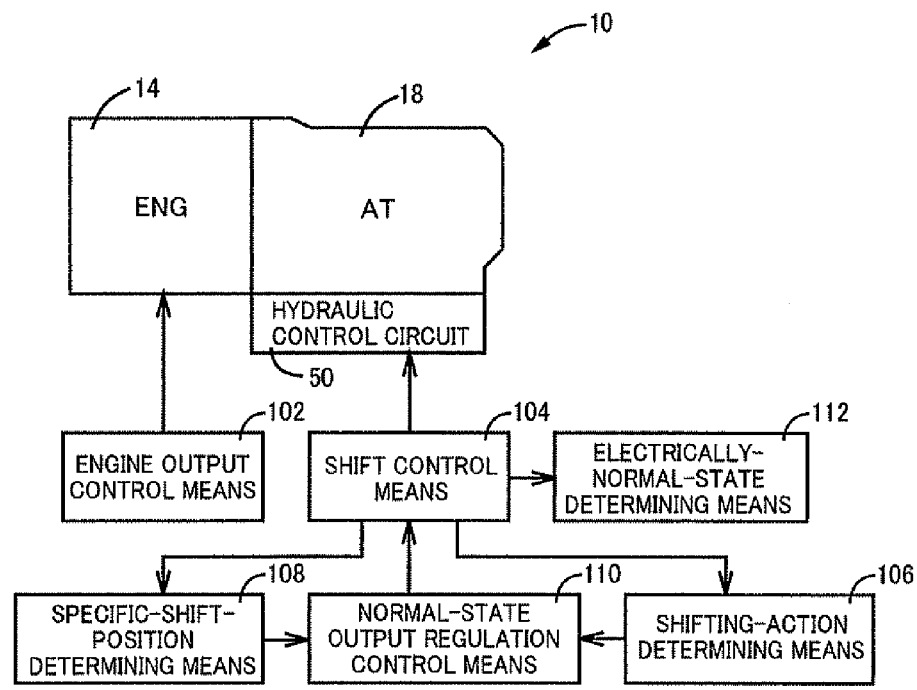
FIG. 5 is a functional block diagram for explaining major control functions of an electronic control device.

FIG. 5 is the functional block diagram for explaining major control functions of the electronic control device 100. An engine output control portion in the form of engine output control means 102 shown in FIG. 5 is configured to generate the engine output control command signals $S_E$ for controlling the throttle actuator to open and close the electronic throttle valve, controlling the fuel injecting device to control the amount of injection of the fuel, and controlling the igniter to control the time of ignition. For example, the engine output control means 102 calculates a target engine torque $T_E^*$ based on the operation amount Acc of the accelerator pedal such that the target engine torque $T_E^*$ increases with an increase of the accelerator pedal operation amount Acc. The engine output control means 102 controls the throttle actuator for controlling the opening angle $\theta_{TH}$ of the electronic throttle valve so as to obtain the above-indicated target engine torque $T_E^*$, on the basis of the actual engine speed $N_E$, and according to a known relationship between the engine speed $N_E$ and an estimated engine torque $T_{EO}$ (e.g. an engine torque map), which relationship is obtained by experimentation in relation to the opening angle $\theta_{TH}$ of the electronic throttle valve, and stored in memory.

A shift control portion in the form of shift control means 104 is configured to determine whether a shifting action of the automatic transmission 18 should be performed or not, that is, to select the shift position to which the automatic transmission 18 is shifted. This determination is made on the basis of the vehicle running condition represented by the actual vehicle running speed V and accelerator pedal operation amount Acc, and according to a known relationship (shifting map) which is stored in memory and which represents shift-up lines and shift-down lines defined in relation to variables in the form of the vehicle running speed V and the accelerator pedal operation amount Acc (or output torque $T_{OUT}$ of the automatic transmission), for instance. The shift control means 104 implements the shift control so that the automatic transmission 18 is automatically shifted to the selected shift position. For this shift control, the shift control means 104 applies the shift control command signal (shifting command or hydraulic command) $S_P$ to the hydraulic control circuit 50, for engaging and/or releasing the coupling devices associated with the shifting action of the automatic transmission 18 to be performed, as indicated in the table of FIG. 3, for establishing the selected shift position. According to the shift control command signal $S_P$ applied to the hydraulic control circuit 50, appropriate ones of the linear solenoid valves SL1-SL6 within the hydraulic control circuit 50 are energized to operate the hydraulic actuators of the corresponding frictional coupling devices, for shifting the automatic transmission 18 to the selected shift position. Thus, the shift control means 104 energizes and de-energizes the appropriate ones of the linear solenoid valves SL1-SL6 for switching the corresponding ones of the clutches C and brakes B between engaged state and released state, to establish the selected shift position. It is noted that the levels of the electric signals for energizing the linear solenoid valves SL1-SL6 for placing the clutches C and brakes B in the engaged state are normally kept at a highest value predetermined for maximizing the output hydraulic pressures of the linear solenoid valves SL1-SL6, in a non-shifting state of the automatic transmission, that is, except while the automatic transmission is in a transient state of a shifting action. Accordingly, the engaging hydraulic pressure of each of the clutches C and brakes B is controlled substantially according to the line pressure PL.

Figure 8:
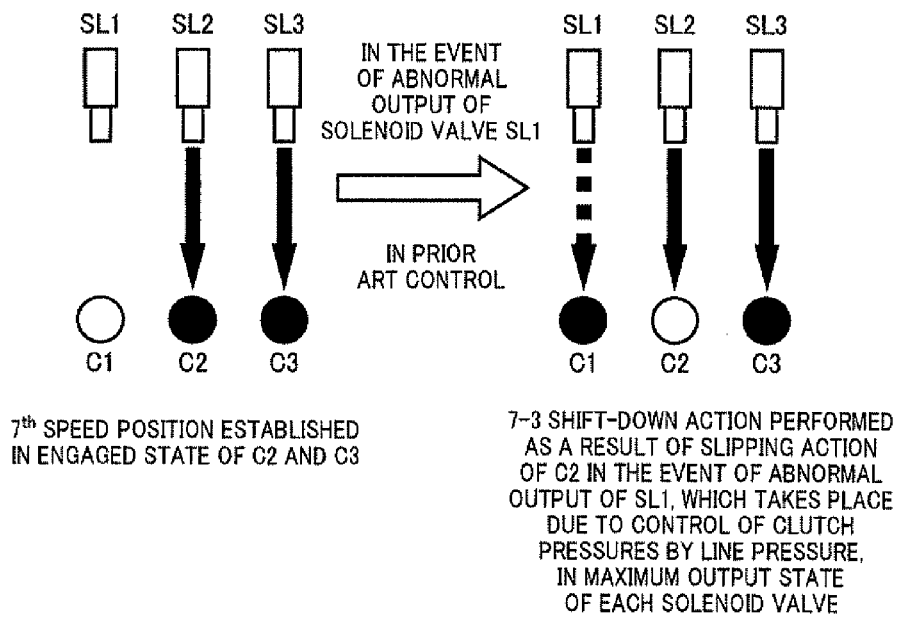
FIG. 8 is a view illustrating a manner of dealing with an abnormal output of a linear solenoid valve, according to the prior art control.

The hydraulic control circuit 50 may suffer from an abnormal output of any of the linear solenoid valves SL1-SL6, which takes place due to an abnormal switching operation of the linear solenoid valve per se caused by sticking of a valve spool in the presence of a foreign matter, for example, a hardware abnormality such as disconnection or shorting of a wire used to apply an electric signal to the solenoid valve, and an abnormality of the electronic control device 100 per se. Namely, the hydraulic control circuit 50 may have an abnormal output of any of the linear solenoid valves SL1-SL6, which causes a problem that the number of the coupling devices placed in the engaged state is larger than the number in the normal states of the solenoid valves (which causes the three or more coupling devices to be placed in the engaged state, in the present embodiment). For reducing the weight and size of the hydraulic control circuit 50 and for reducing the number of the required components, however, the hydraulic control circuit 50 is not provided with the known fail-safe valve having the fail-safe function for dealing with the abnormal output of any of the linear solenoid valves SL1-SL6. Accordingly, in case of abnormal output of one of the linear solenoid valves SL1-SL6 the engaging action of any irrelevant one of the frictional coupling devices which is not normally required to be placed in the engaged state for placing the automatic transmission in the selected shift position may cause the automatic transmission to be shifted to an irrelevant shift position. In the example of FIG. 8, wherein the $7^{th}$ speed position is currently established by the clutches C2 and C3 which are placed in the engaged state at a maximum level of the electric signals applied to energize the linear solenoid valves SL2 and SL3 in the non-shifting state of the automatic transmission. In the event of an abnormal output of the linear solenoid valve SL1, one of the clutches C1, C2 and C3 which has the smallest torque capacity is brought into a slipping state, so that the shift position to be established is determined by the other combination of two frictional coupling devices placed in the engaged state. If the nominal torque capacity of the clutch C2 is the smallest of the nominal torque capacities of the clutches C1, C2 and C3 at the maximum level of the electric signals, the clutch C2 is brought into the slipping state, so that the $3^{rd}$ speed position is established by the engaging actions of the clutches C1 and C3. As a result, the automatic transmission is shifted down from the $7^{th}$ speed position to the $3^{rd}$ speed position, causing a comparatively high stepping ratio of the speed ratio (ratio of the speed ratios γ of the two shift positions =speed ratio of the lower-speed position/speed ratio of the higher-speed position), and a rise of the operating speed of the engine and deceleration of the vehicle by a braking torque of the engine, which lead to deterioration of durability of the engine 14 and the power transmitting system 12, and reduction (deterioration) of drivability of the vehicle.

Figure 6:
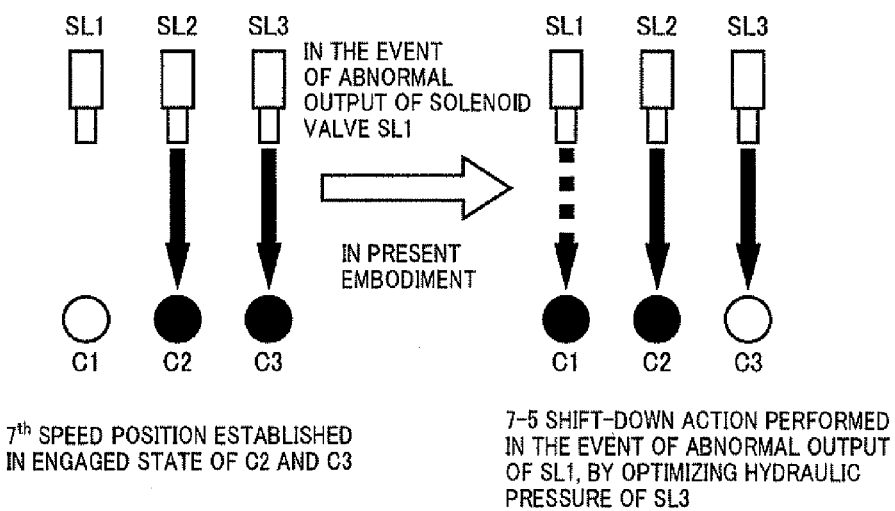
FIG. 6 is a view illustrating a manner of dealing with an abnormality output of any one of the linear solenoid valves.

If the level of the electric signal to be applied to the linear solenoid valve SL3 in the normal state of each linear solenoid valve is determined so that the torque capacity of the clutch C3 is the smallest of the torque capacities of the clutches C1, C2 and C3, the clutch C3 is brought into the slipping state in the event of an abnormal output of the linear solenoid valve SL1, while the clutches C1 and C2 are placed in the engaged state, so that the automatic transmission is shifted to the $5^{th}$ speed position, even where the nominal torque capacity of the clutch C2 is the smallest of the nominal torque capacities of the clutches C1, C2 and C3 at the maximum level of the electric signals, as illustrated in FIG. 6. That is, during normal state the clutch C3 is configured to have a torque capacity with which the clutch C3 is held in the engaged state and the currently established shift position is maintained even when the level of the electric signal to energize the linear solenoid valve SL3 is lower than the maximum value. Further, the level of the electric signal for energizing the linear solenoid valve SL3 for placing the clutch C3 in the engaged state is determined to be lower than the maximum value corresponding to the maximum output hydraulic pressure of the linear solenoid valve SL3, so that the clutch C3 is prevented from being brought into the slipping state in the normal state of each linear solenoid valve, and is brought into the slipping state in the event of an abnormal output of another linear solenoid valve. Thus, it is possible to prevent the shift-down action from the $7^{th}$ speed position to the $3^{rd}$ speed position, which causes a higher stepping ratio of the speed ratio than in the case of the shift-down action from the $7^{th}$ speed position to the $5^{th}$ speed position.

In view of the finding described above, the electronic control device 100 according to the present embodiment is configured to implement a normal-state output regulation control of the linear solenoid valves SL1-SL6, for dealing with an abnormal output of any of the linear solenoid valves SL1-SL6, such that the level of the electric signal for energizing the linear solenoid valve SL for placing one of the two frictional coupling devices in the engaged state to place the automatic transmission in the selected shift position in the normal state of each linear solenoid valve is regulated such that the torque capacity (engaging capacity) of the above-described one frictional coupling device is smaller than the maximum value but is large enough to prevent that frictional coupling device from being brought into the slipping state in the normal state of each linear solenoid valve, and such that the torque capacity permits the above-described one frictional coupling device to be brought into the slipping state in the event of the engaging action of another frictional coupling device caused by an abnormal output of another linear solenoid valve other than the two linear solenoid valves SL corresponding to the above-described two frictional coupling devices, so that the automatic transmission is shifted to a predetermined fail-safe shift position different from the selected shift position, with the engaging action of the above-indicated another frictional coupling device and the engaging action of the other of the above-described two frictional coupling devices. In other words, the electronic control device 100 of the present embodiment is configured to implement the normal-state output regulation control of the linear solenoid valves SL1-SL6 for dealing with the abnormal output of any of the linear solenoid valves SL1-SL6, such that the output hydraulic pressure of the linear solenoid valve SL for placing one of the two frictional coupling devices in the engaged state to place the automatic transmission in the selected shift position in the normal state of each linear solenoid valve is regulated such that the torque capacity of the above-described one frictional coupling device is smaller than the maximum value but is large enough to prevent that frictional coupling device from being brought into the slipping state in the normal state of each linear solenoid valve, and such that the torque capacity permits the above-described one frictional coupling device to be brought into the slipping state in the event of the engaging action of another frictional coupling device caused by an abnormal output of another linear solenoid valve other than the two linear solenoid valves SL for engaging the above-described two frictional coupling devices, so that the automatic transmission is shifted to the predetermined fail-safe shift position different from the selected shift position, with the engaging action of the above-indicated another frictional coupling device and the engaging action of the other of the above-described two frictional coupling devices.

Namely, the electronic control device 100 of this embodiment is configured to implement the normal-state output regulation control of the linear solenoid valves SL1-SL6 for dealing with the abnormal output of any of the linear solenoid valves SL1-SL6, such that the level of the electric signal for energizing one of the linear solenoid valves SL1-SL6 which is assigned to engage the above-indicated one frictional coupling device in the normal state of each linear solenoid valve is determined to be lower than the maximum value corresponding to the maximum output hydraulic pressure of the above-indicated one of the linear solenoid valves SL1-SL6 assigned to engage the above-indicated one frictional coupling device, but is high enough to prevent that frictional coupling device from being brought into the slipping state in the normal state of each linear solenoid valve, and such that the level of the electric signal permits the above-described one frictional coupling device to be brought into the slipping state in the event of an abnormal output of another linear solenoid valve, so that the automatic transmission is shifted to the predetermined fail-safe shift position. Thus, the present embodiment provides the fail-safe function, without using a fail-safe valve. In the present embodiment described above, the engaging hydraulic pressure of the predetermined frictional coupling device which is brought into the slipping state to establish the above-indicated fail-safe shift position in the event of an abnormal output of any of the linear solenoid valves is regulated to be lower than the line pressure PL (namely, lower than the maximum hydraulic pressure), and such that the torque capacity of the predetermined frictional coupling device is large enough to prevent the slipping action of the predetermined frictional coupling device depending upon the transmission input torque $T_{AT}$, in the normal state of each linear solenoid valve, but is small enough to permit this frictional coupling device to be brought into the slipping state in the event of an abnormal output of another of the linear solenoid valves SL1-SL6.

The electronic control device 100 according to the present embodiment is provided with an electrically-normal-state determining portion in the form of electrically-normal-state determining means 112 for determining whether each of the linear solenoid valves SL1-SL6 is in an electrically normal state or not, depending upon whether the electric signal being actually applied to each of the linear solenoid valves SL1-SL6 has the maximum level (is the maximum level signal) corresponding to the maximum output hydraulic pressure of each linear solenoid valve, while the automatic transmission is currently placed in any one of the forward-drive shift positions, namely, while the shift lever 78 is placed in the automatic forward-drive position D. For example, the electrically-normal-state determining means 112 makes an electrically-normal-state determination in the automatic forward-drive position D, that each of the linear solenoid valves SL1-SL6 is in the electrically normal state, if it is determined at least once during a run (trip) of the vehicle between the moments of on and off operations of an ignition switch of the vehicle, that the electric signal applied to the linear solenoid valves SL1-SL6 has the maximum level. Described more specifically, a threshold value of the level of the electric signal for detecting the maximum level signal is predetermined for each of the linear solenoid valves SL1-SL6, to determine that the linear solenoid valve is in the electrically normal state, if the level of the electric signal is held higher than the predetermined threshold value for a predetermined length of time (for example, several seconds). This electric signal is a signal of an electric current actually applied to the corresponding one of the linear solenoid valves SL1-SL6, and the level of the electric signal is detected by various methods, for example, detected directly by an electric current sensor, or determined on the basis of an amount of drop of a voltage by a resistor provided in a wire through which the electric current flows.

By the way, the linear solenoid valve SL3, for instance, is energized to place the automatic transmission 18 of the present embodiment in the $3^{rd}$ speed position, $7^{th}$ speed position and the first reverse-drive position. The electric signal to be applied to the linear solenoid valve SL3 is required to have the maximum level for placing the clutch C3 in the engaged state to establish the first reverse-drive position. If the required level of the electric signal to be applied to the linear solenoid valve SL3 for placing the clutch C3 in the engaged state to establish the $3^{rd}$ speed position as well as the $7^{th}$ speed position is lower than the maximum value, it is not possible to make the electrically-normal-state determination of the linear solenoid valve SL3 in the automatic forward-drive position D, depending upon whether the level of the electric signal has the maximum value. That is, since the output hydraulic pressure of the linear solenoid valve SL3 is required to have the maximum value for establishing the first reverse-drive position, it is not possible to make the electrically-normal-state determination of the linear solenoid valve SL3, on the basis of the level of the electric signal which is lower than the value corresponding to the maximum output hydraulic pressure. Accordingly, it may not be possible to not only adequately perform the fail-safe function in the event of the abnormal output of the linear solenoid valves SL1-SL6, but also adequately make the electrically-normal-state determination of each of the linear solenoid valves SL1-SL6.

In view of the above, the present embodiment is configured to implement the above-described normal-state output regulation control when the automatic transmission is placed in a predetermined one of the shift position, namely, a specific shift position from which the automatic transmission is shifted down to another shift position in the event of an abnormal output of any of the linear solenoid valves SL1-SL6, with the engaging action of one of the frictional coupling devices caused by the abnormal output of the above-indicated linear solenoid valve, and the engaging action of one of the two frictional coupling devices required to be placed in the engaged state to establish the above-indicated predetermined shift position, such that the shift-down action from the above-indicated predetermined shift position to the above-indicated another shift position causes a stepping ratio of the speed ratio which is higher than an upper limit. In order to prevent this shift-down action of the automatic transmission causing the stepping ratio of speed ratio higher than the upper limit, during the specific position, the normal-state output regulation control is implemented to shift the automatic transmission to the fail-safe shift position, by the engaging action of the frictional coupling device caused by the abnormal output, and the engaging action of the other of the above-indicated two frictional coupling devices. For instance, the predetermined or specific shift position is selected such that a shift-down action of the automatic transmission from this predetermined shift position has a risk of causing reduction of the durability of the engine 14 and the power transmitting system 12, and deterioration of the vehicle drivability. In the example of FIG. 8, the $7^{th}$ speed position is the specific shift position from which the automatic transmission may be shifted down to the $3^{rd}$ speed position in the event of the abnormal output of the linear solenoid valve SL1 and thus engagement of clutches C1 and C3, with a result of a stepping ratio of the speed ratio higher than the upper limit.

When the automatic transmission is placed in the $7^{th}$ speed position predetermined as the specific shift position, for example, the level of the electric signal for energizing the linear solenoid valve SL3 for placing the clutch C3 in the engaged state in the normal state of each linear solenoid valve is regulated to be lower than the maximum value but high enough to prevent the clutch C3 from being brought into the slipping state in the normal state of each linear solenoid valve, and so as to permit the clutch C3 to be brought into the slipping state in the event of an abnormal output of the linear solenoid valve SL1. Accordingly, the clutch C3 is brought into the slipping state in the event of the abnormal output of the linear solenoid valve SL1, so that the $5^{th}$ speed position is established as the fail-safe shift position by the engaging actions of the clutches C1 and C2, as indicated in FIG. 6. When the automatic transmission is placed in the $3^{rd}$ speed position which is not predetermined as the specific shift position, the level of the electric signal for energizing the linear solenoid valve SL3 is regulated to have the maximum value, so that the electrically-normal-state determination of the linear solenoid valve SL3 can be adequately made.

Described more specifically referring back to FIG. 5, a shifting-action determining portion in the form of shifting-action determining means 106 is configured to determine whether the automatic transmission 18 is in the process (namely, in a transient state) of a shifting action under the control of the shift control means 104, or not. For example, the shifting-action determining means 106 makes the determination as whether the automatic transmission 18 is in the process of the shifting action under the control of the shift control means 104, depending upon whether the levels of the electric signals applied to the linear solenoid valves SL1-SL6 are varying and indicate the transient state of the shifting action, rather than held constant as in the non-shifting action of the automatic transmission.

A specific-shift-position determining portion in the form of specific-shift-position determining means 108 is operated when the shifting-action determining means 106 has determined that the automatic transmission 108 is not in the process of a shifting action, that is, in the non-shifting state. This specific-shift-position determining means 108 is configured to determine whether the specific shift position is currently established or not. For instance, the specific-shift-position determining means 108 makes the determination as to whether the specific shift position is currently established or not, on the basis of the shift control command signal $S_P$ generated from the shift control means 104.

A normal-state output regulation control portion in the form of normal-state output regulation control means 110 is operated when the specific-shift-position determining means 108 has determined that the specific shift position is currently established. This normal-state output regulation control means 110 is configured to apply a normal-state output regulation control command to the shift control means 104, for implementing the above-described normal-state output regulation control. According to this normal-state output regulation control command, the shift control means 104 regulates the level of the electric signal to a predetermined value for energizing one of the linear solenoid valves SL1-SL6 which places one of the two frictional coupling devices in the engaged state to place the automatic transmission in the specific shift position, such that the level of the electric signal is lower than the maximum value but is high enough to prevent that one frictional coupling device from being brought into the slipping state in the normal state of each linear solenoid valve, and such that the level permits the above-indicated one frictional coupling device to be brought into the slipping state in the event of an abnormal output of another linear solenoid valve. While the above-indicated normal-state output regulation control command is not generated, on the other hand, the shift control means 104 maintains the maximum level of the electric signals applied to the two valves of the linear solenoid valves SL1-SL6 for placing the two frictional coupling devices in the engaged state to maintain the currently established shift position.

Figure 7:
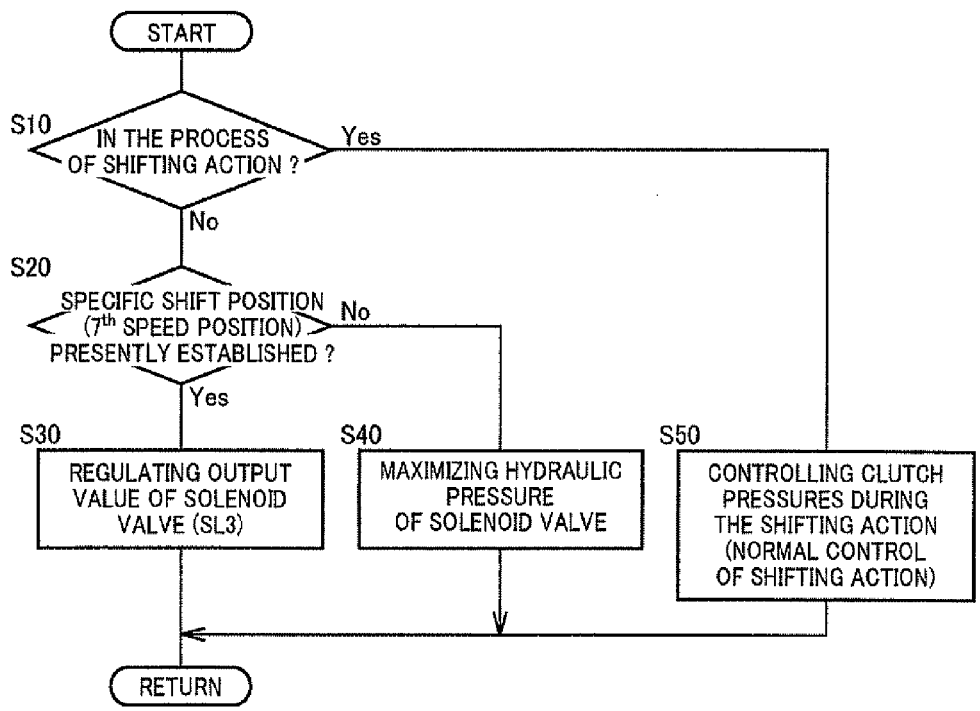
FIG. 7 is a flow chart illustrating a major control operation of the electronic control device, that is, a control operation which permits an adequate fail-safe function to be performed in the event of an abnormal output of any linear solenoid valve, without using a fail-safe valve.

FIG. 7 is the flow chart illustrating a major control operation of the electronic control device 100, that is, a control operation which permits an adequate fail-safe function to be performed in the event of an abnormal output of any of the linear solenoid valves SL1-SL6, without providing the hydraulic control circuit 50 with a fail-safe valve. This control operation is repeatedly performed with an extremely short cycle time of about several milliseconds to several tens of milliseconds.

Initially, step S10 of the FIG. 7 (hereinafter "step" being omitted) corresponding to the shifting-action determining means 106 is implemented to determine whether the automatic transmission 18 is in the process (namely, in the transient state) of a shifting action or not. If a negative determination is obtained in S10, the control flow goes to S20 corresponding to the specific-shift-position determining means 108, to determine whether the above-indicated specific shift position (for example, $7^{th}$ speed position) is currently established or not. If an affirmative determination is obtained in S20, the control flow goes to S30 corresponding to the normal-state output regulation control means 110 and shift control means 104, to generate the above-indicated normal-state output regulation control command for the specific shift position, for regulating the level of the electric signal for energizing the linear solenoid valve (SL3, for example) which places one (clutch C3, for example) of the two frictional coupling devices (clutches C2 and C3, for example) in the engaged state to place the automatic transmission in the specific shift position ($7^{th}$ speed position, for example), such that the level of the electric signal is lower than the predetermined maximum value. If a negative determination is obtained in S20, on the other hand, the control flow goes to S40 corresponding to the shift control means 104, to maintain the maximum level of the electric signals applied to the two valves of the linear solenoid valves SL1-SL6 for placing the two frictional coupling devices in the engaged state to maintain the currently established shift position. If an affirmative determination is obtained in the above-indicated S10, the control flow goes to S50 corresponding to the shift control means 104, to control the engaging hydraulic pressures of the frictional coupling devices in the transient state of the shifting action, that is, to maintain a normal control of the shifting action of the automatic transmission 18.

The present embodiment described above is configured to implement the above-described normal-state output regulation control when the predetermined shift position is established with the two frictional coupling devices placed in the engaged state, so that it is possible to prevent a shift-down action of the automatic transmission 18 to any one of the shift positions, which causes a comparatively high ratio of the stepping change of the speed ratio, even if the frictional coupling device not required to be placed in the engaged state to establish the selected shift position of the automatic transmission 18 is brought into the engaged state in the event of an abnormal output of any of the linear solenoid valves SL1-SL6. Namely, the shift-down action to the shift position causing the comparatively high ratio of the stepping change of the speed ratio can be prevented by determining the frictional coupling device which is brought into the slipping state to establish the fail-safe shift position, in the event of an abnormal output of any of the linear solenoid valves SL1-SL6. For example, the level of the electric signal to be normally applied to one of the linear solenoid valves SL1-SL6 for engaging one of the two frictional coupling devices, which cooperates with the frictional coupling device to be brought into the engaged state in the event of the above-indicated abnormal output of the corresponding linear solenoid valve, to shift down the automatic transmission 18 to the shift position causing the comparatively high ratio of the stepping change of the speed ratio, is determined so as to prevent the slipping action of the above-indicated one frictional coupling device in the normal state of each linear solenoid valve, but to permit the slipping action of this one frictional coupling device in the event of the above-indicated abnormal output, so that the automatic transmission 18 is shifted down to the fail-safe shift position, in the event of the abnormal output, with the engaging action of the frictional coupling device caused by the abnormal output, and the engaging action of the other of the above-indicated two frictional coupling devices, whereby the shift-down action to the shift position causing the comparatively high ratio of the stepping change of the speed ratio can be prevented. Thus, the present embodiment permits the fail-safe function to be performed, in the event of an abnormal output of any of the linear solenoid valves SL1-SL6 without further installing fail-safe valves or the like.

Further, according to the embodiment, the above-described normal-state output regulation control is implemented when the automatic transmission is placed in the specific shift position, so that the automatic transmission is held in the specific shift position in the normal state of each linear solenoid valve, and the fail-safe function can be adequately performed in the event of an abnormal output of any of the linear solenoid valves SL1-SL6. Further, the above-described normal-state output regulation control implemented only when the automatic transmission is placed in the specific shift position makes it possible to not only adequately perform the fail-safe function in the event of the abnormal output of any of the linear solenoid valves SL1-SL6, but also adequately make the electrically-normal-state determination of each of the linear solenoid valves SL1-SL6, without the provision of a fail-safe valve.

While the preferred embodiment of this invention has been described in detail by reference to the drawings, it is to be understood that the present invention may be otherwise embodied.

The illustrated embodiment is configured to maintain the maximum level of the electric signals applied to the two linear solenoid valves for placing the two frictional coupling devices in the engaged state to maintain the currently established shift position, except when the currently established shift position is the specific shift position, that is, except when the level of the electric signal for energizing the linear solenoid valve which places one of the two frictional coupling devices in the engaged state to maintain the specific shift position is regulated to be lower than the predetermined maximum value. However, the level of the electric signals applied to the above-indicated two linear solenoid valves need not always be maintained at the maximum value. In the above-described electrically-normal-state determination in the automatic forward-drive position D, for instance, each linear solenoid valve is determined to be in the electrically normal state, if it is determined at least once during a run (trip) of the vehicle that the electric signal applied to the linear solenoid valve has the maximum level. Accordingly, the level of the electric signal is required to be maximized at least once to maximize the output hydraulic pressure of each linear solenoid valve corresponding to each frictional coupling device involved in establishing each forward-drive shift position. For example, the clutch C1 is placed in the engaged state to establish the $1^{st}$ speed position through the $5^{th}$ speed position other than the specific shift position, the level of the electric signal to be applied to the linear solenoid valve SL1 for placing the clutch C1 in the engaged state is required to be maximized when at least one of the $1^{st}$ speed position through the $5^{th}$ speed position is currently established. In this case, too, the above-indicated electrically-normal-state determination can be adequately made.

Although the $7^{th}$ speed position is selected as the specific shift position, by way of example in the illustrated embodiment, any other shift position may be selected as the specific shift position. In the event of an abnormal output of the linear solenoid valve SL3 while the $5^{th}$ speed position is currently established, for example, the clutch C2 is brought into the slipping state, so that the automatic transmission may be shifted to the $3^{rd}$ speed position, with the clutches C1 and C3 placed in the engaged state. Where the $5^{th}$ speed position is selected as the specific shift position, the level of the electric signal for energizing the linear solenoid valve SL1 to place the clutch C1 in the engaged state to maintain the $5^{th}$ speed position may be regulated to be lower than the predetermined maximum value, so that in the event of an abnormal output of the linear solenoid valve SL3 during the $5^{th}$ speed position, the clutch C1 is brought into the slipping state, whereby the automatic transmission is shifted to the $7^{th}$ speed position, with the clutches C2 and C3 placed in the engaged state.

In the illustrated embodiment, the automatic transmission 18 is configured to be shifted to shift positions, with respective combinations of engagement of two frictional coupling devices. However, the shift positions may be established with respective combinations of engagement of at least two frictional coupling devices. For instance, the principle of this invention is equally applicable to a vehicular automatic transmission which is shifted its shift positions with respective combinations of engagement of three frictional coupling devices.

While the torque converter 16 provided as a fluid-operated power transmitting device is provided with the lock-up clutch 38 in the illustrated embodiment, the torque converter 16 need not be provided with the lock-up clutch 38. Further, the torque converter 16 may be replaced by any other type of fluid-operated power transmitting device, such as a fluid coupling which does not perform a torque boosting function.

It is to be understood that the present invention has been described above for illustrative purpose only, and that the invention may be embodied with various other changes and improvements, which may occur to those skilled in the art.

NOMENCLATURE OF ELEMENTS

18: Vehicular automatic transmission
50: Hydraulic control circuit
100: Electronic control device (Control apparatus)
C: Clutches (Frictional coupling devices)
B: Brakes (Frictional coupling devices)
SL1-SL6: Linear solenoid valves (Solenoid valves)

The invention claimed is:

1. A control apparatus for a vehicular automatic transmission configured to selectively establish a plurality of shift positions by engaging respective combinations of two frictional coupling devices of a plurality of frictional coupling devices, with output hydraulic pressures of respective ones of a plurality of solenoid valves provided in a hydraulic control circuit, comprising:

a normal-state output regulation control portion configured to regulate the output hydraulic pressure of one of the solenoid valves for placing one of the two frictional coupling devices in an engaged state to place the vehicular automatic transmission in a predetermined one of the shift positions in a normal state of each of the solenoid valves, such that a torque capacity of the one of the two frictional coupling devices is smaller than a maximum value but is large enough to prevent the one of the two frictional coupling devices from being brought into a slipping state in the normal state of each of the solenoid valves, and such that the torque capacity permits the one of the two frictional coupling devices to be brought into the slipping state in the event of an engaging action of another of the plurality of frictional coupling devices caused by an abnormal output of another of the plurality of solenoid valves which is other than the two solenoid valves for engaging the two frictional coupling devices, so that the vehicular automatic transmission is shifted to a predetermined fail-safe shift position different from the predetermined shift position, with the engaging action of the another of the frictional coupling devices and an engaging action of the other of the two frictional coupling devices; and an electrically-normal-state determining portion configured to make an electrically-normal-state determination as to whether each of the solenoid valves is in an electrically normal state, depending upon whether an electric signal being applied to each of the solenoid valves has a maximum level corresponding to a maximum value of the output hydraulic pressure of each of the solenoid valves, when the vehicular automatic transmission is placed in any one of forward-drive shift positions, wherein the electrically-normal-state determination is made such that the electric signal having the maximum level corresponding to the maximum value of the output hydraulic pressure of each of the solenoid valves corresponding to the frictional coupling devices for placing the vehicular automatic transmission in the any one of the forward-drive positions is applied at least once to each of the solenoid valves when the vehicular automatic transmission is placed in the any one of the forward-drive positions.

2. The control apparatus according to claim 1, wherein the predetermined shift position is a shift position from which the vehicular automatic transmission is shifted down to another shift position by the engaging action of the another of the frictional coupling devices caused by the abnormal output of the another of the solenoid valves, and an engaging action of the another of the frictional coupling devices, such that a shift-down action from the predetermined shift position to the another shift position causes a stepping ratio of a speed ratio of the vehicular automatic transmission which is higher than an upper limit, and wherein the level of the electric signal to be applied to the one of the solenoid valves for placing the one of the two frictional coupling devices in the engaged state when the vehicular automatic transmission is placed in the predetermined shift position is lower than a maximum value corresponding to the maximum value of the output hydraulic pressure of the one of the solenoids valves for placing the one of the two frictional coupling devices in the engaged state, but is high enough to prevent the one of the two frictional coupling devices from being brought into the slipping state.

\* \* \* \* \*